Patented Sept. 30, 1941

2,257,590

UNITED STATES PATENT OFFICE 2,257,590

DISPLACEMENT METER FOR MEASURING FLUIDS

William H. D. Brouse, Toronto, Ontario, Canada, assignor, by mesne assignments, to John Wood Manufacturing Company Inc., Conshohocken, Pa.

Application September 15, 1939, Serial No. 295,026

7 Claims. (Cl. 73—247)

The principal objects of this invention are to provide a meter mechanism for accurately measuring fluids while being dispensed which is capable of being easily and quickly adjusted to obviate error, and which will not require close machining to avoid leakage and will therefore obviate excess friction and will be inexpensive to build.

This invention relates to meters of the type in which the measurement of the fluid is determined by the displacement of pistons within chambers through which the fluid is caused to flow, and the principal feature of the invention consists in the provision of a displaceable diaphragm member forming one wall of the measuring chamber and the arrangement of adjustable means to effect a measured displacement of said member and thereby change the cubical capacity of the chamber to the flow of fluid during each stroke of the piston.

A further important feature consists in the novel manner of supporting the displaceable member by spring means to measure a maximum displacement, such displacement being decreased by adjustable displacement of the displaceable member in opposition to said spring means.

In the accompanying drawings Figure 1 is a horizontal mid-sectional view of a piston type displacement meter showing my improved adjustment means arranged on the end of one of the cylinders.

Figure 4 is a sectional view similar to Figure 2 showing a modified arrangement of volume adjustment device arranged upon the piston.

Figure 5 is a sectional view showing a further modified form of the invention.

Figure 1:
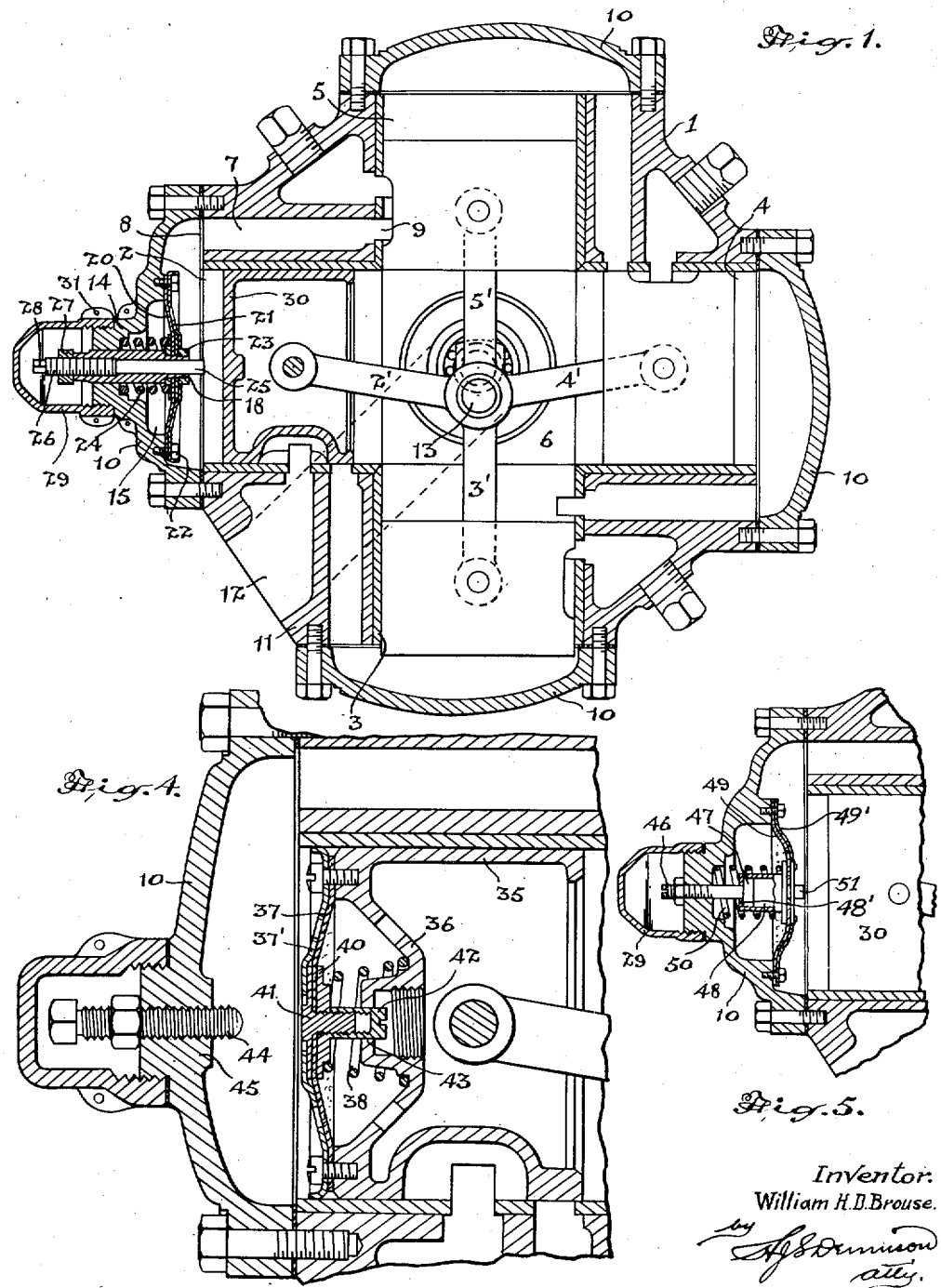

The type of meter to which the present invention is herein shown applied is one which is commonly known and is illustrated in United States Patent No. 1,912,687, dated June 6, 1933, in which the meter casing 1 is formed with a plurality of cylinders 2, 3, 4 and 5 arranged in diametrically opposite pairs which extend outwardly from a central chamber 6.

The casing 1 has formed therein extending along one side of each cylinder a duct 7 which communicates with a port 8 at the outer end of the cylinder and leads to a port 9 adjacent to the inner end of the adjacent cylinder. The outer end of each cylinder is closed by a cap 10 which extends past the port 8 and closes the outer end of the duct 7.

A boss 11 arranged between the cylinders 2 and 3 encloses the inlet duct 12 which leads into the central chamber 6 and is suitably connected to the feed pump which directs a constant flow of fluid to be measured into the chamber 6.

The meter is adapted to operate with the cylinders in a horizontal plane and the individual pistons, arranged respectively in the cylinders 2, 3, 4 and 5, are here shown connected by connecting rods 2', 3', 4' and 5' with a crank shaft 13 which operates the registering mechanism.

The registering mechanism attached to this crank device is well known and is fully shown and described in the patent above-mentioned and need not be further described herein as it does not apply in any direct manner to the present invention. The crank shaft 13 may also operate a recording mechanism.

Figure 2:
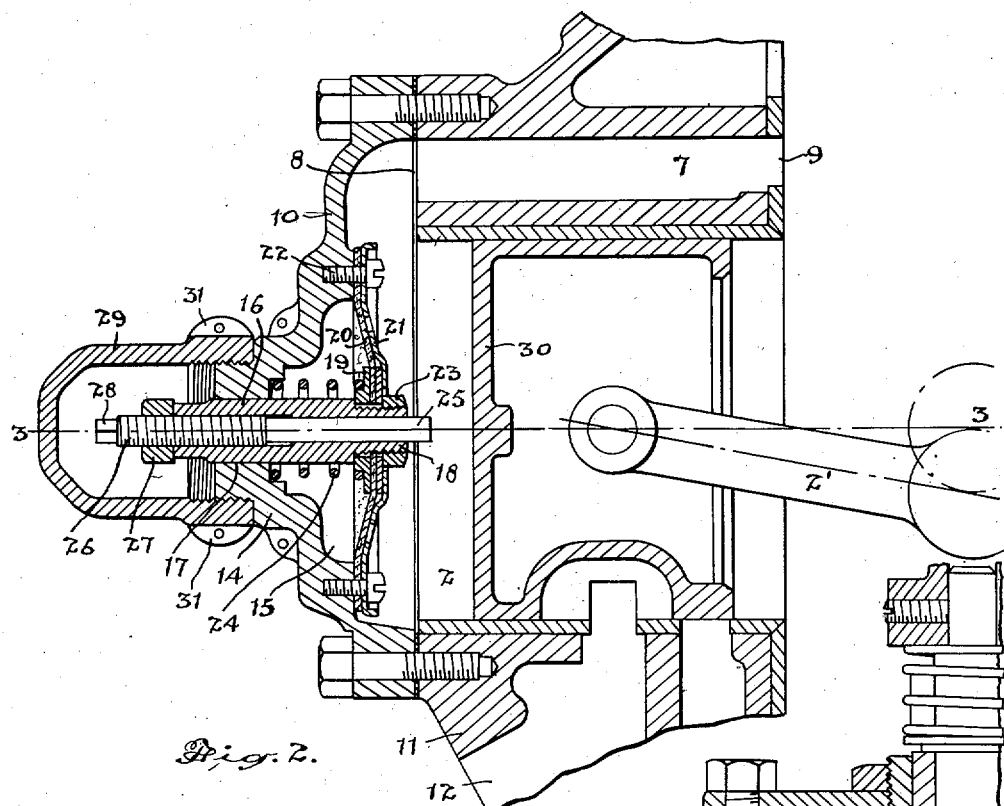
Figure 2 is an enlarged sectional elevational view of one end of the cylinder bearing the improved volume adjustment device.

In the form of the invention illustrated in Figures 1 and 2 the cylinder cap 10 is formed with an outwardly projecting boss 14, on the inner side of which is a cupped recess 15.

A plunger 16 is slidably mounted in a cylindrical orifice 17 in the boss 14 and said plunger has a reduced threaded end 18 upon which is mounted a flanged collar 19. A flexible diaphragm 20 is mounted outside of the flanged collar 19 and is supported by a perforated sheet metal diaphragm 21, both of which are secured around their perimeters by screws 22 extending into the portion of the cap surrounding the recess 15. A nut 23 is threaded on the outer end of the threaded end 18 of the plunger and binds the central portion of the diaphragm 20 tightly against the collar 19 but is free to move in the central opening of the member 21 which forms an outward limit for the diaphragm 20.

A coil compression spring 24 encircles the plunger 16 and bears against the flanged collar 19 and against the bottom of the recess 15. The plunger 16 is bored longitudinally and internally threaded at the outer end, and a pin 25 extends through the bored plunger and is provided with a threaded portion 26 engaging the internally threaded portion of the plunger, and a lock nut 27 is threaded on said pin to abut the outer end of the plunger. The plunger is here shown provided with a squared key-end 28 at its outer end to permit of its ready adjustment.

A cap 29 is threaded on to the threaded outer extremity of the boss 14 and encloses the outer end of the plunger. The inner end of the pin 25 projects past the end of the plunger and is adjusted to engage the end of the piston 30 operating in the cylinder 2, and in accordance with the adjustment of this pin within the plunger, the plunger has imparted thereto a stroke of the required distance which it is desired to flex the diaphragm outwardly in order to enlarge the cubical area or space within the cylinder cavity.

It will be understood that the spring 24 is sufficiently strong to withstand any pressure that may be normally exerted by the liquid flowing through the meter, that is to say, it will resist the unbalanced fluid pressure without deflecting the diaphragm, but if the measurement of the meter is required to be adjusted it is merely necessary to remove the cap 29, loosen the lock nut 27 and adjust the pin in the plunger so that it will engage the piston at an earlier or later period in its reciprocating movement.

It will be readily appreciated that adjustments of the meter may be very readily accomplished and that its measurement may be maintained accurately at all times. The adjusting cap may of course be suitably sealed by proper officials so that adjustments can only be made in their presence. For this purpose the cap is provided with perforated lugs 31 through which a sealing wire may be inserted.

Figure 3:
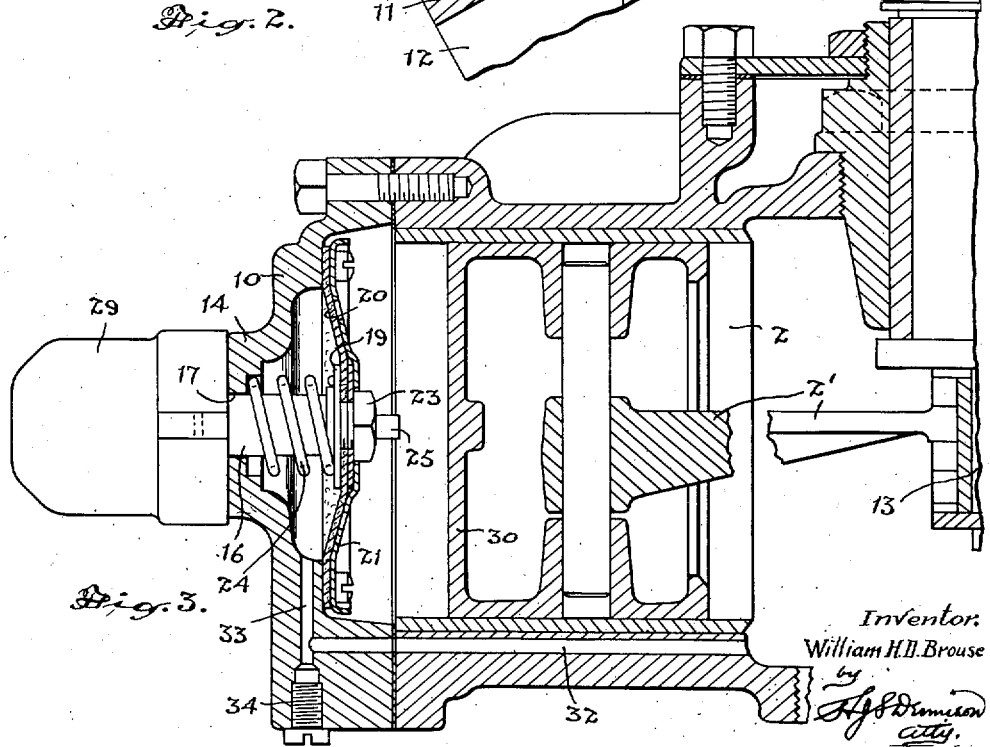
Figure 3 is a part sectional elevation taken through the line 3—3 of Figure 2.

It will of course be understood that it will be desirable to equalize the pressure on the outside of the diaphragm with the pressure in the chamber 6 and in order to accomplish this result in a simple and effective manner a duct 32, as illustrated in Figure 3, is arranged to extend from the central chamber 6 along one side of the cylinder and this connects with a transverse duct 33 arranged in the cap 10, which leads in to the recess 15 outside of the diaphragm. A screw 34 is shown closing the outer end of the duct drilled laterally in the head 10.

A modification of this form of adjustment is shown in Figure 4 in which the piston 35 is formed with a depressed head 36 and a diaphragm 37 is secured to the perimeter of the depression under the perforated fixed diaphragm plate 37' which forms an outward limit to the diaphragm 37. A coil compression spring 38 is arranged between the outer side of the piston head and the inner side of the diaphragm 37, said spring engaging a flange collar 40 mounted on a threaded stud 41 which is provided with a sleeve nut 42 which slides in an orifice 43 in the boss of the piston.

An adjusting screw 44 is threaded in the boss 45 of the cylinder head and this engages the stud 41 on the piston on its outward movement and flexes the diaphragm inwardly, thereby increasing the cubical capacity of the cylinder and cylinder head space in a manner substantially the same as that described in connection with the structure illustrated in Figures 1 and 2, that is to say, the spring 38 is required to hold the diaphragm 37 in contact with the outer sheet metal diaphragm member 37' during periods when variation in pressures occur during the operating cycle of the meter, but as the piston 35 is moved outwardly the centre of the diaphragm carried by the piston 35, coming into engagement with the screw 44 in the head before the piston reaches its maximum stroke, is depressed inwardly and creates an enlargement of the cubical capacity of the cylinder head opposite said piston, thereby enabling the passage of the correct amount of fluid therethrough.

In the modified form of the device shown in Fig. 5 a pin 46 threaded in the cylinder cap is provided with a head 47 at the inner end which is slidably enclosed within a cylindrical member 48, the outer end of which is secured to the flexible diaphragm 49, mounted in the recessed cylinder cap. A coil spring 50 is arranged to engage the diaphragm to hold it inwardly against the dished diaphragm member 49' so that the flanged head of the adjusting pin engages the inturned flange 48' of the member 48 and thus limits the spring-urged inward movement of the diaphragm 49 in relation to the meter piston.

A pin projection 51, fixed to the member 48 or diaphragm 49, is arranged to be engaged by the head of the piston 30 near the end of its displacement stroke to positively move the diaphragm 49 outwardly an amount dependent on the setting of the pin 46 to thereby effect a regulation of the cubical measurement of the measuring chamber and control the volume of fluid displaced therefrom.

What I claim as my invention is:

1. A displacement fluid meter of the class described having at least one measuring cylinder in which a fluid displacement piston adapted to be connected with an indicating or recording mechanism operates, said cylinder and piston presenting opposing heads, one of said heads being formed with a depression-forming recess, a flexible diaphragm secured to the rim of said recess, resilient spring means housed in said recess and engaging said diaphragm to oppose fluid-pressure displacement thereof, and means for effecting a regulated displacement of the diaphragm into the said head recess in opposition to the resilient spring means therein at the end of each displacement stroke of the piston including a contact member mounted in said cylinder head.

2. A displacement fluid meter of the class described having at least one measuring cylinder through which the fluid flows in which a fluid displacement piston adapted to be connected with an indicating or recording mechanism operates, characterized in that said cylinder has a head provided with a co-axial recess, a displaceable disc-like member sealing said recess from the cylinder interior and displaceable in part at least axially of the said piston and cylinder, a compression spring housed in said recess co-axially of the disc-like member and urging the latter toward the said displacement piston in opposition to the fluid pressure obtaining in the said cylinder, means for limiting the spring-urged displacement of said disc-like member leaving the same free of axial obstruction, and adjustable means connected with said disc-like member and projecting axially therebeyond free of obstructing contact with said limiting means for operative engagement with the said displacement piston in the axial region.

3. A displacement fluid meter as claimed in claim 1 in which a cupped metal diaphragm is applied over the recess to limit the spring-urged displacement of the flexible diaphragm, said metal diaphragm being secured to the recessed head in clamping and sealing relation to the flexible diaphragm and being perforated to permit free access of the fluid under measurement between the respective flexible and metal diaphragms.

4. A displacement fluid meter as claimed in claim 1 in which the recess is formed in the piston head so that the flexible diaphragm and spring means are carried bodily by the said piston.

5. A displacement fluid meter of the class described having at least one measuring cylinder through which the fluid flows and in which a fluid displacement piston adapted to be connected with an indicating or recording mechanism operates, said cylinder having a recess in the head thereof, a flexible diaphragm secured to the rim of said recess, a coil compression spring mounted in said recess and engaging said diaphragm, a plunger secured to said diaphragm and slidably mounted in said cylinder head, and adjustable means mounted in said plunger adapted to engage said piston.

6. A device as claimed in claim 5 in which the plunger is provided with a longitudinal threaded bore, and said adjustable means includes a pin threaded in said bore and extending therebeyond to be engaged by the piston.

7. A device as claimed in claim 5 in which a passage extends from the recess in the head and communicates with the inward end of the cylinder.

WILLIAM H. D. BROUSE.